United States Patent [19]

Kuroda et al.

[11] Patent Number: 4,924,699
[45] Date of Patent: May 15, 1990

[54] POSITION MEASURING METHOD USING A SATELLITE

[75] Inventors: Hiroshi Kuroda, Hitachi; Nobuo Kurihara, Hitachiota; Shinichi Sakamoto, Hitachi, all of Japan

[73] Assignee: Hitachi, Ltd., Tokyo, Japan

[21] Appl. No.: 106,664

[22] Filed: Oct. 13, 1987

[30] Foreign Application Priority Data

Oct. 13, 1986 [JP] Japan .................................. 61-241308

[51] Int. Cl.$^5$ .............................................. G01C 21/00
[52] U.S. Cl. .................................. 73/178 R; 340/990; 364/449
[58] Field of Search ............. 73/178 R; 340/988, 989, 340/990, 995; 364/443, 449, 460

[56] References Cited

U.S. PATENT DOCUMENTS

| | | | |
|---|---|---|---|
| 4,677,450 | 6/1987 | Ito et al. | 73/178 R |
| 4,677,561 | 6/1987 | Akama et al. | 73/178 R |
| 4,677,562 | 6/1987 | Uota et al. | 73/178 R |
| 4,677,563 | 6/1987 | Itoh et al. | 73/178 R |

*Primary Examiner*—Donald O. Woodiel
*Attorney, Agent, or Firm*—Antonelli, Terry & Wands

[57] ABSTRACT

A method position measurement in which position about satellite orbits and information about time are received from satellites to determine a position of a point. The method includes a step to calculate a direction in which an error occurs based on positional information of a satellite and a step to determine the position of the point by use of road map information in the direction of the error.

4 Claims, 8 Drawing Sheets

POSITION MEASURING METHOD USING A SATELLITE

BACKGROUND OF THE INVENTION

The present invention relates to a position measuring method for measuring one's position by use of a radio wave from a satellite.

A system for measuring position by use of a radio wave from a satellite has been described, for example, in the JP-A-58-30615. The position measuring system using a radio wave from a satellite is referred to as a GPS system herebelow. In this system, a position in a plane, namely, azimuth on the surface of the earth can be measured by use of three satellites. When using four satellites, not only measurement in a plane (for the latitude and the longitude) but also measurement of height (above the sea level) can be effected.

In the GPS system, since the measurement is accomplished by use of satellites, the precision thereof is determined by the positions of the satellites. When the satellites to be used are located at positions relatively near to the position to be measured or conditions which permit the receipt of radio waves is disturbed, the accuracy of the measurement is lowered.

SUMMARY OF THE INVENTION

It is therefore an object of the present invention to provide a position measuring method in a GPS system in which error in the measurement can be reduced and the deterioration of the measuring accuracy can be prevented.

According to the present invention, there is provided a position measuring method in a GPS system in which a direction where a great error results in the GPS system, namely, a direction of the fluctuation in a result of a position measurement is calculated from positions of satellites and the error in the direction of the fluctuation is corrected by use of an intersection between the fluctuation direction and a direction of a fluctuation attained from another map information or from combination with another satellite.

When satellites are located at unfavorable locations or the condition to receive radio waves therefrom is disturbed, the direction where the error takes place is determined depending on the arrangement of satellites from which radio waves can be received. If a correction with respect to the direction of the error can be achieved by use of other information, for example, information from a map, the error can be reduced and hence the measuring accuracy is improved. In addition to the correction of the error by use of map information, the error can also be corrected by combining the satellite with another satellite.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

Figure 1:
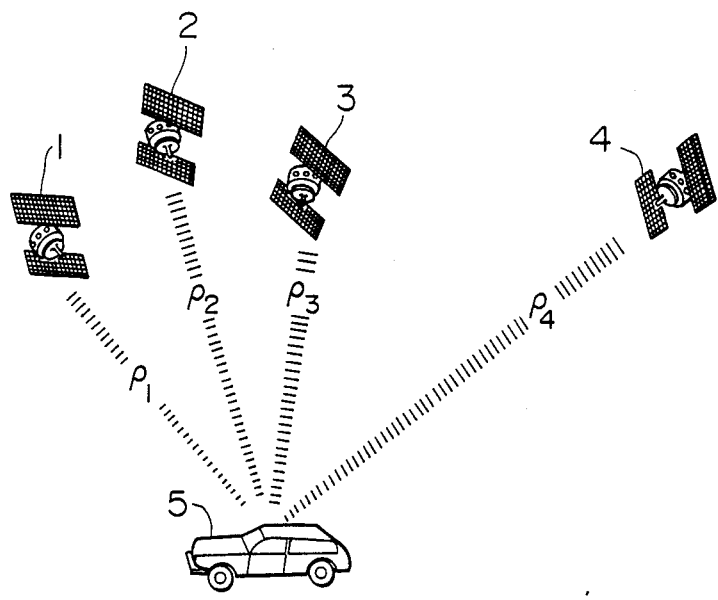
FIG. 1 is a schematic diagram showing the principle of position measurement in a GPS system.

Referring now to the drawings, an embodiment of the present invention will be described. FIG. 1 is a schematic diagram showing the principle of the position measurement in the GPS system including satellites 1-4 used in the GPS system and a measuring position 5. In this system, positions of the satellites are calculated from data sent from the satellites, the data concerning orbits of the satellites; furthermore, the period of time necessary for the radio wave to travel from the satellite to the measuring position is measured for each satellite so as to attain a distance from the satellite to the measuring position, thereby solving a system of equations of position measurement to obtain the measuring position. It has been found in this situation that the error in the position measurement is closely related to the arrangement of the satellites. According to the calculated results, for a favorable arrangement of the satellite, the absolute error of the position measurement is about 30 m; whereas for an unfavorable arrangement of the satellites, the absolute error of the position measurement is at least 200 meters (m). However, the fluctuation of the measured results in a case of an unfavorable arrangement of the satellite, namely, the error of the position measurement is found to be attended with an orientation determined by the satellite arrangement.

Figure 2:
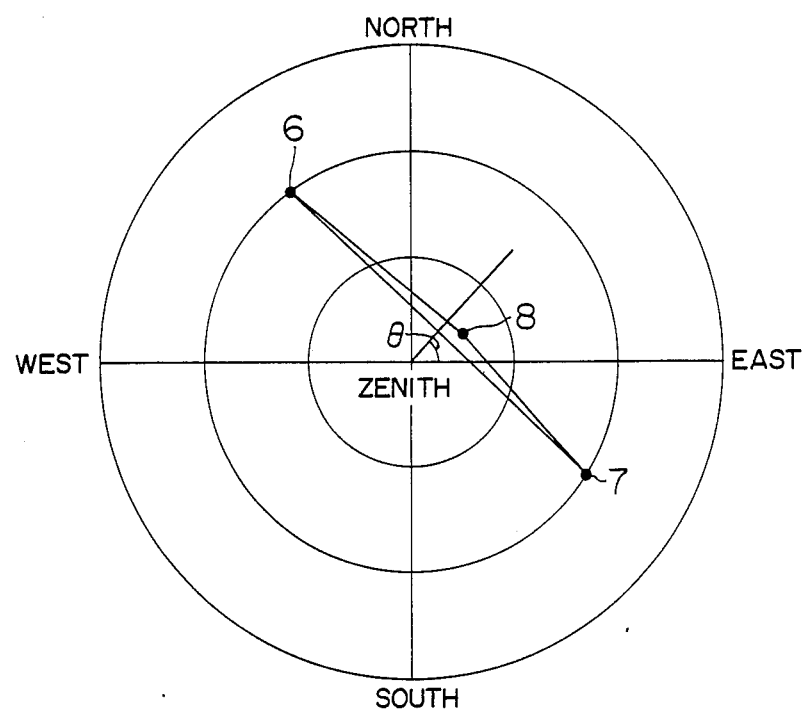
FIG. 2 is a diagram schematically illustrating the relationships between satellite positions and directions of errors appearing in the results of the measurement.
Figure 3:
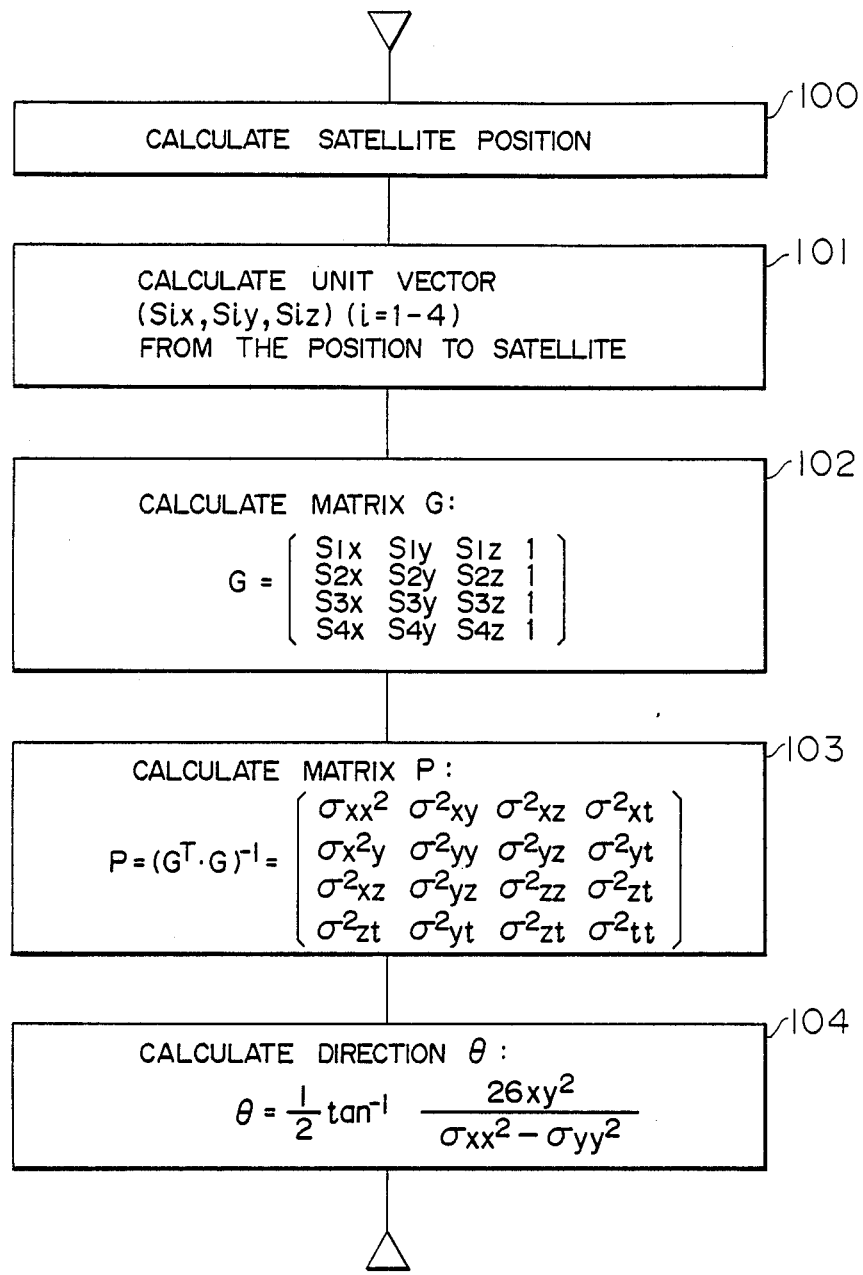
FIG. 3 is a flowchart illustrating an operation to attain a direction of the error.

FIG. 2 shows an arrangement of the satellites in which reference numerals 6-8 each indicate satellite positions. In this diagram, the outer-most circle represents an angle of elevation 0 and the center of the circle is the zenith. The direction of the fluctuation $\theta$ can be calculated from the satellite arrangement. FIG. 3 is a flowchart showing the calculation method of the fluctuation direction $\theta$. Although FIG. 2 illustrates a case where a 2-dimensional position measurement is achieved by use of three satellites, the calculation method similarly applies to a case where a 3-dimensional position measurement is effected by use of four satellites.

Computation of the direction of the fluctuation (i.e. the direction of the error) is achieved according to the flowchart of FIG. 3. First, in step 100, the positions of the satellites are calculated. The method of the position calculation has already been known. Next, a unit vector from the measuring position to the satellite is calculated for each satellite in step 101. It is assumed here that an x axis, a y axis, and a z axis are respectively drawn in the directions to the east, north, and zenith viewed from the own position. Step 102 obtains a matrix-G, which is then used in step 103 to calculate a covariance matrix P.

Step 104 calculates the fluctuation direction $\theta$ from the elements of the covariance matrix P. Although FIG. 3 shows a case where four satellites are used, if a 2-dimensional position measurement is accomplished with three satellites, the matrix G of the step 102 becomes $$\vec{G} = \begin{bmatrix} S_{1x} S_{1y} S_{1z} 1 \\ S_{2x} S_{2y} S_{2z} 1 \\ S_{3x} S_{3y} S_{3z} 1 \\ 0 \ 0 \ -1 \ 0 \end{bmatrix}$$

and the fluctuation direction $\theta$ is calculated through the steps 103–104.

Figure 4:
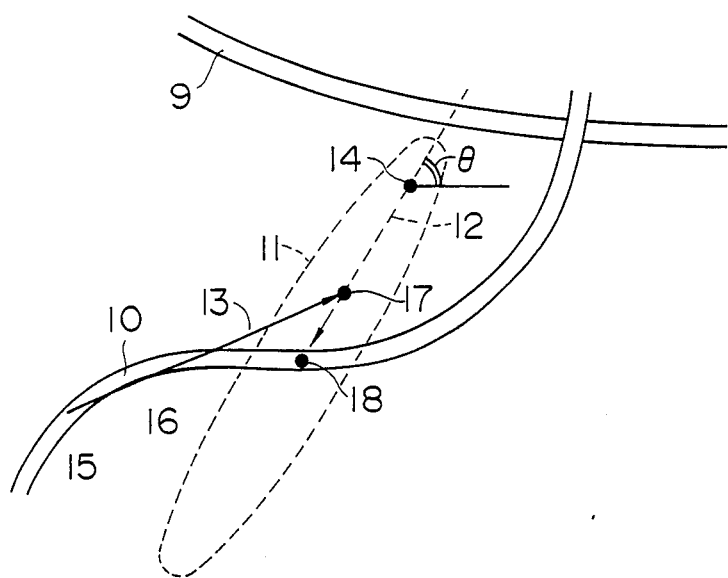
FIG. 4 is a schematic diagram showing a method to correct the error of the position measurement by use of map information.
Figure 5:
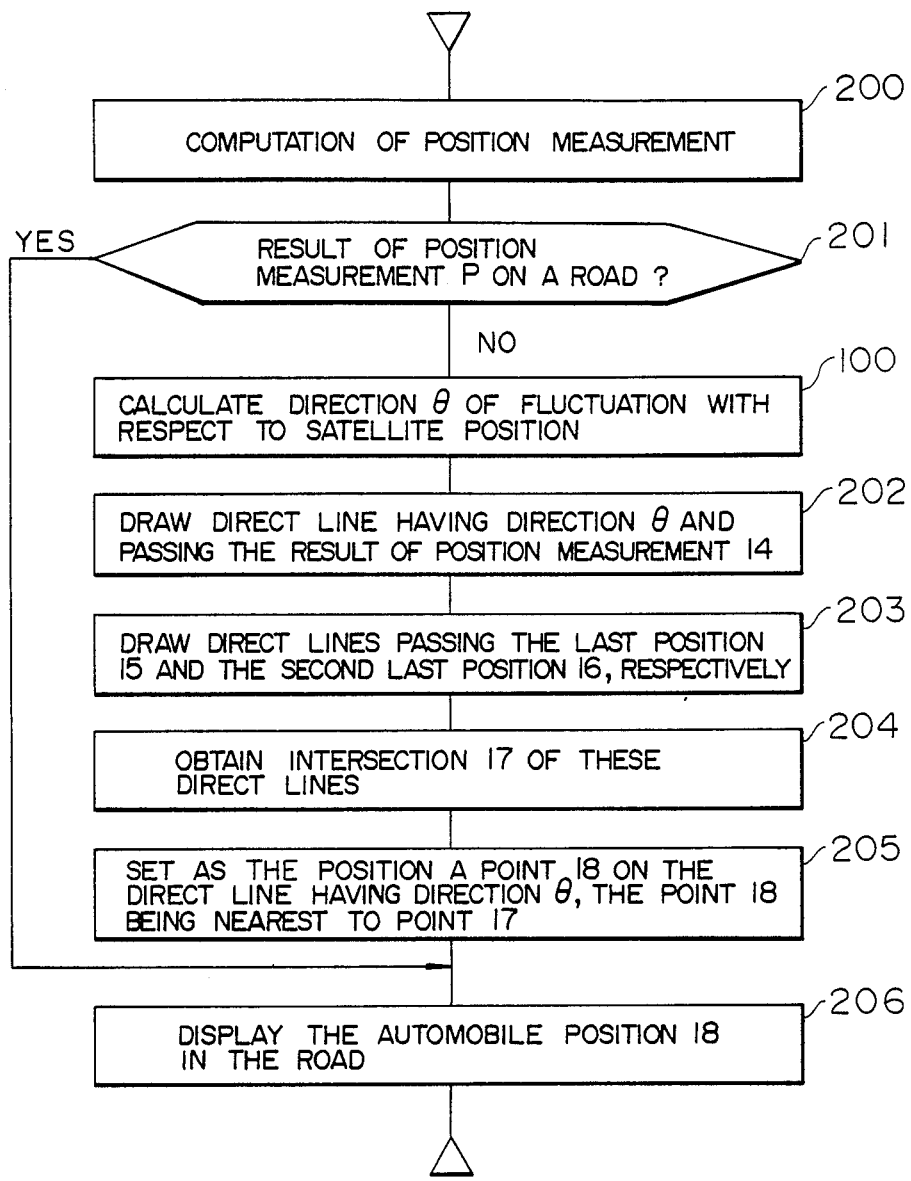
FIG. 5 is a flowchart depicting a method to correct the error of the position measurement by use of map information.

FIG. 4 shows a method to correct measured results by use of the fluctuation direction and road map information, whereas FIG. 5 is a flowchart of the correction method. Assume that the result of computation of the position measurement indicates point 14 in step 200. Step 201 judges whether or not the point 14 is on a road. Incidentally, reference numerals 9–10 represent roads in FIG. 4.

If the point 14 is not on the road, step 100 is executed to attain the fluctuation direction $\theta$. In FIG. 4, the figure enclosed with a dotted line 11 indicates a distribution of the measured results. In step 202, a direct line 12 having a direction $\theta$ is drawn to pass the point 14. When this direct line 12 has an intersection with respect to a road, the intersection is regarded as the measuring position. However, since the direct line 12 generally intersects a plurality of roads, a direct line 13 is drawn to pass the points 15 and 16 representing the results of the last measurement and the second to the last measurement, respectively. Step 204 then attains an intersection 17 between the direct lines 12 and 13. In step 205, a point 18 on the direct line 12 and nearest to the point&17 is recognized to be the measuring position, and then step 206 displays the point 18 as the measuring position.

Figure 6:
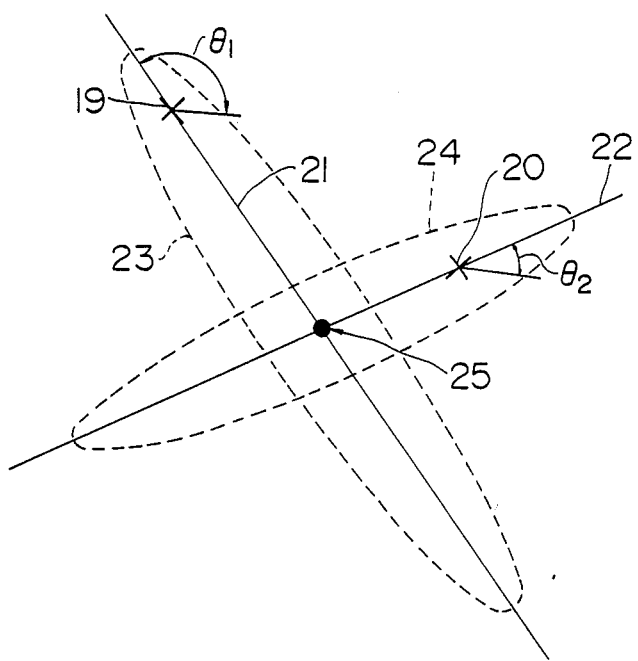
FIG. 6 is a diagram schematically showing a method to correct the error in the position measurement by combining the satellite with another satellite.
Figure 7:
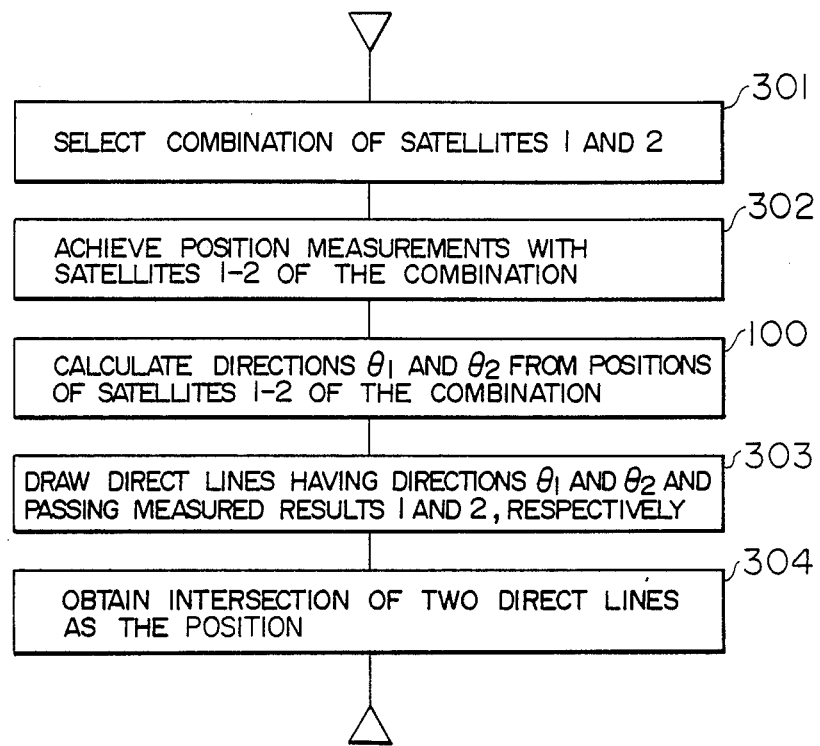
FIG. 7 is a flowchart illustrating an operation to accomplish the correction of FIG. 6.

FIG. 6 shows a method in which the position measurement is achieved by use of two satellites and the measurement results are corrected depending on the combination of the satellites; whereas FIG. 7 is a flowchart illustrating the operation of the method. Step 301 selects a combination of two satellites and then step 302 effects the respective operations for the position measurement so as to attain points 19–20 as results of the point measurements. In the routine 100, the fluctuation directions $\theta_1$ and $\theta_2$ are attained from locations of the satellites 1–2 of the combination. Dotted lines 23–24 respectively indicate distributions of the results of the position measurements. In step 303, two direct lines 21–22 respectively having the fluctuation directions are drawn to pass the results of the position measurements. Step 304 obtains an intersection 25 of the two direct lines 21–22 as the measuring position.

Figure 8:
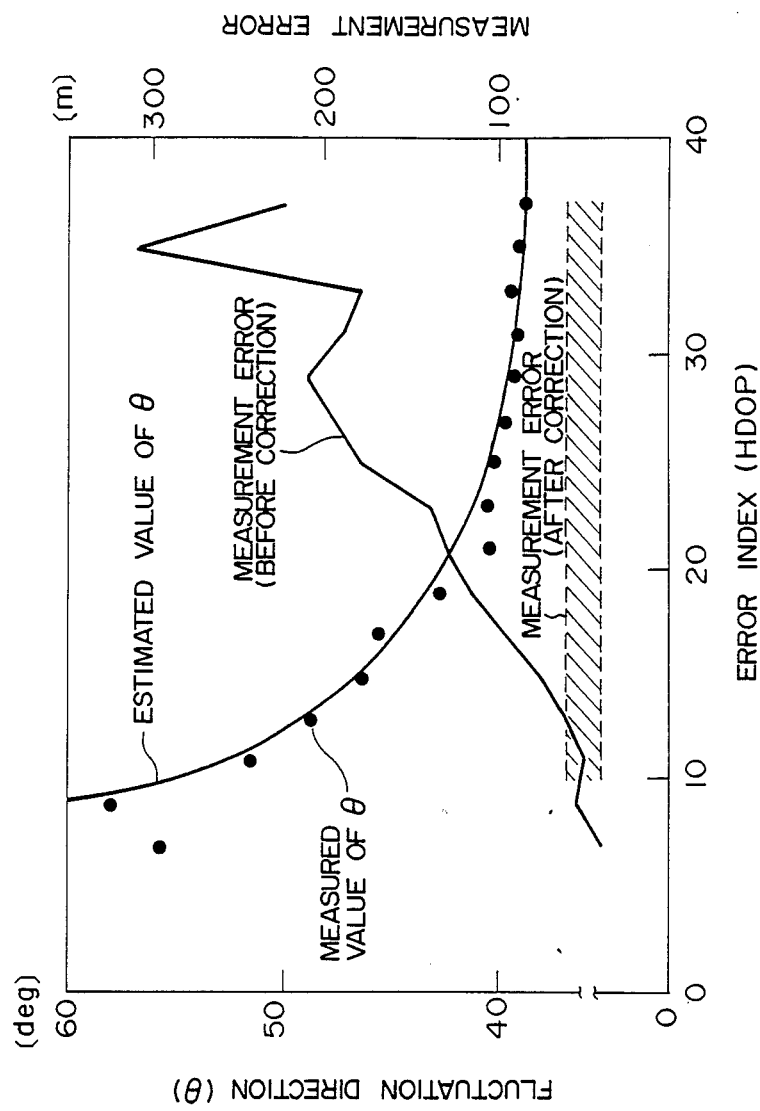
FIG. 8 is a graph showing the relationships of the direction of the fluctuation between the actual measurement and the calculated results and those between the error of the position measurement and the error indices determined by the arrangement of the satellite.

FIG. 8 is a graph showing relationships of the fluctuation direction between the measured values and the calculated values and those between the errors of the position measurements and the error indices determined by the satellite arrangement. The estimated values of the fluctuation direction $\theta$ substantially agree with the measured values thereof for the error index equal to or greater than ten, which enables to confirm that the fluctuation angle $\theta$ is appropriately specified. Incidentally, the errors of the position measurements are indicated by the values before the correction in this graph.

The error index is substantially proportional to the measurement error and the error of the position measurement is at least 200 m when the error index is at least 30. When the correction method according to the present invention is applied to the results of the position measurement, the error of the position measurement after the correction can be reduced to about 50 m as indicated by the shaded area in FIG. 8.

According to the present invention, in a case where the measuring position is determined by use of the GPS system, the fluctuation directions of the results of the position measurements can be estimated beforehand from the arrangement of satellites so as to correct the results of the position measurements, which loads to an effect that the absolute error of the measuring position thus attained car be minimized.

While the present invention has been described with reference to the particular embodiment, it is not restricted by the embodiment but only by the appended claims. It is to be appreciated that those skilled in the art can change and modify the embodiment without departing from the scope and spirit of the invention.

We claim:

1. A method for position measurement in a system having a plurality of satellite wherein said position measurement is performed using positional information of each satellite which includes information of an orbital path of said satellite and information of time elapsed between transmitting a signal from said satellite and receiving said signal at a point a position of which is to be measured, said method comprising the steps of:
   calculating a direction in which an error occurs in position measurement for said satellite using positional information of said satellite; and
   determining said position of said point by using road map information in said direction of said error.

2. A method according to claim 1 further comprising the steps of:
   judging whether a result of determining said position of said point is an appropriate position on a map;
   calculating a second direction in which a second error from occurs in position measurement for an arrangement of satellite using positional information of said arrangement of satellite when said result is not an appropriate position on said map; and
   drawing a line extending in said second direction of said second error and passing through said position of said point determined by said determining step so as to attain an appropriate position on said line as an appropriate position of said point.

3. A method for position measurement in a system having a plurality of satellites wherein said position measurement is performed using positional information of a satellite which includes information of an orbital path of said satellite and information of time elapsed between transmitting a signal from said satellite and receiving said signal at a point a position of which is to be measured, said method comprising the steps of:
   calculating a direction in which an error occurs in position measurement for a combination of satellites using positional information of said combination of satellites;
   calculating a direction in which another error occurs in position measurement for another combination of satellites using positional information of said other combination of satellites; and determining a position of a point from an intersection of lines representing said error and said other error respectively, each line extending in the direction in which said errors occur.

4. A method for position measurement in a system having a plurality of satellites wherein said position measurement is performed using positional information of each satellite which includes information of an orbital path of said satellite and information of time elapsed between transmitting a signal from said satellite and receiving said signal at a point a position of which is to be measured, said method comprising the steps of:

calculating said position of said point based on positional information from said satellites;

judging whether said position of said point is on a road of a map;

calculating a direction (O), a fluctuation from an arrangement of satellites using positional information of said arrangement of satellites when said position of said point is not on a road;

drawing a line having a gradient equal to the fluctuation direction (O) and passing through said position of said point calculated by said calculating step;

attaining an intersection between a line through passing a position of a point indicated by a result of the last position measurement and a position of a point indicated by a result of the second to the last position measurement; and outputting as an appropriate position of said point position which exists on a road and is nearest to said intersection.

* * * * *